United States Patent [19]
De Cupere

[11] Patent Number: 5,456,855
[45] Date of Patent: Oct. 10, 1995

[54] STABLE GRANULAR FOAM CONTROL AGENT COMPRISING A SILICONE ANTIFOAM COMPOUND AND GLYCEROL

[75] Inventor: Marcel J. J. De Cupere, Kessel-Lo, Belgium

[73] Assignee: The Procter & Gamble Company, Cincinnati, Ohio

[21] Appl. No.: 75,554

[22] PCT Filed: Jan. 13, 1992

[86] PCT No.: PCT/US92/00191

§ 371 Date: Jun. 15, 1993

§ 102(e) Date: Jun. 15, 1993

[30] Foreign Application Priority Data

Jan. 16, 1991 [EP] European Pat. Off. ............. 91870007

[51] Int. Cl.⁶ ................................. C11D 3/22; C11D 3/08
[52] U.S. Cl. .................. 252/174.15; 252/321; 252/358; 252/174.13; 252/174.17; 252/174.21
[58] Field of Search ............................... 252/174.15, 321, 252/358, 174.13, 174.17, 174.21

[56] References Cited

U.S. PATENT DOCUMENTS

| | | | |
|---|---|---|---|
| 3,933,672 | 1/1976 | Bartolotta et al. | 252/116 |
| 4,013,573 | 3/1977 | Leikhim et al. | 252/89 R |
| 4,437,349 | 5/1984 | Tai | 252/174.13 |
| 4,447,349 | 5/1984 | Tai | 252/174.13 |
| 4,451,387 | 5/1984 | Tai et al. | 252/174.15 |
| 4,457,387 | 7/1984 | Taylor | 180/6.48 |
| 4,637,890 | 1/1987 | Crabtree et al. | 252/90 |
| 4,652,392 | 3/1987 | Baginski et al. | 252/109 |
| 4,732,694 | 3/1988 | Gowland et al. | 252/174.21 |
| 4,806,266 | 2/1989 | Burrill | 252/174.15 |
| 4,894,177 | 1/1990 | Starch | 252/174.15 |
| 4,919,843 | 4/1990 | Innertsberger et al. | 252/358 |
| 5,238,596 | 8/1993 | Smith | 252/175.15 |

FOREIGN PATENT DOCUMENTS

| | | | |
|---|---|---|---|
| 0414221A2 | 9/1909 | European Pat. Off. | C11D 3/37 |
| 0091802 | 10/1983 | European Pat. Off. | |
| 0143315 | 6/1985 | European Pat. Off. | C11D 1/16 |
| 0206522 | 12/1986 | European Pat. Off. | C11D 3/00 |
| 0210731 | 2/1987 | European Pat. Off. | |
| 0382464 | 8/1990 | European Pat. Off. | C11D 17/00 |

*Primary Examiner*—Paul Lieberman
*Assistant Examiner*—Kery A. Fries
*Attorney, Agent, or Firm*—Ken K. Patel; Jacobus C. Rasser; Jerry J. Yetter

[57] ABSTRACT

The present invention provides stable, free-flowing foam-control agent in granular form, comprising a silicone antifoam compound, a carrier material, an organic coating material, characterized in, that they contain glycerol, at a weight ratio with the silicone antifoam compound of 1:4 to 2:1. The present invention also provides detergent compositions containing said foam control agent.

11 Claims, No Drawings

STABLE GRANULAR FOAM CONTROL AGENT COMPRISING A SILICONE ANTIFOAM COMPOUND AND GLYCEROL

TECHNICAL FIELD

The present invention is concerned with foam control agents in granular form and with detergent compositions containing such agents.

BACKGROUND

It has become common practice in the detergent industry to include in detergent compositions materials which are intended to control the amount of foam produced during a washing cycle in a washing machine.

Indeed, excessive sudsing has been found to interfere negatively with the action of the wash liquor upon the fabrics.

Silicone antifoam agents have been found to be particularly effective species, and efforts have been directed to increase the stability of such agents upon prolonged storage of the detergent compositions containing them.

In GB 1,492,339, it has been proposed to coat silicone antifoam agents with an organic material which is a water soluble or water dispersible, substantially non-surface active, detergent-impermeable material e.g. gelatin, agar or certain reaction products of tallow alcohol and ethylene oxide.

In EP-A-210 721, it has been proposed to coat silicone antifoam agents with water-insoluble fatty acid or fatty alcohols, and in EP-A-210 731 it has been disclosed to coat silicone antifoam agents with a monoester of glycerol and a fatty acid.

While such antifoam agents in granulate form appear to exhibit desirable stability upon storage, when incorporated in detergent compositions, it has been found that such antifoam granulates were not ideally suited for an easy incorporation into detergent compositions in powder form, such as dry-mixing.

It is thus the object of the present invention to provide storage-stable foam controlling agents, in the form of granulates which are free flowing and easily processable into a detergent composition.

SUMMARY OF THE INVENTION

The present invention provides a stable, free-flowing foam-control agent in granular form for inclusion in a detergent composition in powder form, comprising a silicone antifoam compound, a carrier material, preferably starch, an organic coating material, characterized in, that it contains glycerol, at a weight ratio with the silicone antifoam compound of 1:4 to 2:1.

The present invention also provides detergent compositions containing a surface-active agent, said foam control agent, and optionally other detergent ingredients.

DETAILED DESCRIPTION OF THE INVENTION

The Silicone Antifoam Compound

The silicone antifoam compound is present in the foam-control agents of the invention, at levels of from 5% to 20% by weight, preferably 8% to 15% by weight.

In industrial practice, the term "silicone" has become a generic term which encompasses a variety of relatively high-molecular-weight polymers containing siloxane units and hydrocarbyl groups of various types. Generally, the silicone suds-controllers can be described as siloxanes having the general structure:

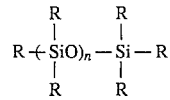

where each R independently can be an alkyl or an aryl radical. Examples of such substituents are methyl, ethyl, propyl, isobutyl, and phenyl. Preferred polydiorganosiloxanes are polydimethylsiloxanes having trimethylsilyl end-blocking units and having a viscosity at 25° C. of from $5 \times 10^{-5}$ m$^2$/s to 0.1 m$^2$/s i.e. a value of n in the range 40 to 1500. These are preferred because of their ready availability and their relatively low cost.

A preferred type of silicone antifoam agent useful in the compositions herein comprises a mixture of an alkylated siloxane of the type hereinabove disclosed and solid silica.

The solid silica can be a fumed silica, a precipitated silica or a silica made by the gelformation technique. The silica particles suitably have an average particle size of from 0.1 to 50 m, preferably from 1 to 20 m and a surface area of at least 50 m$^2$/g. These silica particles can be rendered hydrophobic by treating them with dialkylsilyl groups and/or trialkylsilyl groups either bonded directly onto the silica or by means of a silicone resin. It is preferred to employ a silica the particles of which have been rendered hydrophobic with dimethyl and/or trimethyl silyl groups. Silicone antifoams employed in a foam control agent according to the invention suitably have an amount of silica in the range of 1 to 30% (more preferably 2.0 to 15%) by weight of the total weight of the silicone antifoam resulting in silicone antifoams having an average viscosity in the range of from $2 \times 10^{-4}$ m$^2$/s to 1 m$^2$/s. Preferred silicone antifoams may have a viscosity in the range of from $5 \times 10^{-3}$ m$^2$/s to 0.1 m$^2$/s. Particularly suitable are silicone antifoams with a viscosity of $2 \times 10^{-2}$ m$^2$/s or $4.5 \times 10^{-2}$ m$^2$/s.

The Carrier Material

The carrier material for use herein provides the solid basis on which the silicone antifoam agent, the organic coating material, and the glycerol are deposited during manufacture; the carrier material must therefore be in the form of solid particles, which are compatible with detergent ingredients, are water-soluble or water-dispersible to facilitate the dispersion of the silicone antifoam agent in the aqueous liquor during the wash cycle, and are capable to absorb or adsorb the silicone antifoam agent.

The carrier material is present in the present foam control agents at levels of from 40% to 80% by weight, preferably 55% to 65% by weight.

A preferred carrier material for use in foam control agents according to the invention is starch, native or chemically modified both hot or cold gelling in water; other suitable materials are kieselguhr and Fuller's earth.

It is also possible to choose carrier particles for use herein, among ingredients which themselves play an active role in the laundering or washing process. Examples of such materials are zeolites, sodium tripolyphosphate (STPP) particles, sodium sulphate, sodium carbonate, carboxymethylcellulose and clay minerals.

The Organic Coating Material

The organic coating material is present at levels of from 5 to 30% of the antifoam agents according to the invention, preferably from 8% to 22% by weight.

Organic coating material suitable for use in the granules of the present invention, can be water soluble/dispersible species, water-insoluble species, or a mixture thereof.

Water-soluble or water-dispersible coating materials must be impermeable to detergent and must be substantially non-surface active. By substantially non-surface active is meant that the coating material, itself, does not interact with the silicone material in such fashion that it is emulsified or otherwise excessively dispersed throughout an aqueous medium, rather than at the air/water interface.

A wide variety of coating materials having the requisite solubility/dispersibility characteristics and the essential features of being non-surface active and detergent-impermeable are known. For example, the high-molecular-weight Carbowaxes ("Carbowax" is a trade mark) which have substantially not surface-active characteristics are useful herein. Examples of this type of material include the polyethyleneglycols having a molecular weight of from about 1,500 to about 10,000, especially about 4,000. Highly ethoxylated fatty alcohols such as tallow alcohol condensed with about 25 molar proportions of ethylene oxide are useful herein. Other alcohol condensates containing extremely high ethoxylate proportions (ca 80) are also useful herein. Such high ethoxylates apparently lack sufficient surface-active characteristics to interact or otherwise interfere with the desired suds-control properties of the silicone agents herein. A particularly preferred ethoxylated coating material herein is tallow alcohol condensed with about 80 molar proportions of ethylene oxide, and abbreviated $TAE_{80}$.

A variety of other materials useful as water-soluble/dispersible coating agents herein may also be mentioned: gelatin; agar; gum arabic; and various algae-derived gels.

Water-insoluble organic materials suitable for use in a foam control agent according to the invention are water-insoluble fatty acids, fatty alcohols, fatty acid esters and mixtures thereof. Fatty acids or fatty alcohols are species which have from 10 to 20 carbon in their alkyl chain.

Suitable fatty acids are saturated or unsaturated and can be obtained from natural sources such as, for example, plant or animal esters (e.g. palm oil, coconut oil, babassu oil, safflower oil, taloil, castor oil, tallow and fish oils, grase, and mixtures thereof) or can be synthetically prepared for example via the oxidation of petroleum or by hydrogenation of carbon monooxide via the Fisher-Tropsch process. Examples of suitable fatty acids for use in the present invention include capric, lauric, myristic, palmitic, stearic, arachidic and behenic acid.

Preferred is stearic acid. Also preferred is tallow ($C_{16}$–$C_{18}$) fatty acid. Alcohols derived from the above-mentioned fatty acids are suitable for the foam control agents herein, stearic alcohol and tallow ($C_{16}$–$C_{18}$) alcohol being preferred.

Esters of the above-mentioned fatty acids with $C_{1-3}$ alcohols are also suitable, such as ethyl myristate, ethyl stearate, methyl palmitate, and glycerol mono stearate, this latter species being especially preferred.

Among the above water-insoluble fatty materials, stearyl acid and stearyl alcohol are especially preferred. These materials are preferred because of their good performance, easy availability and suitable melting point. The melting points of stearic acid and stearyl alcohol are 71.5° and 59.4° C. respectively at which temperatures they are insoluble in water. These materials do not appear to interfere with the effectiveness of the silicone antifoam when it is released into the washing liquor.

Mixtures of the above water-soluble/dispersible coating agents and of the above water-insoluble organic materials herein are also suitable. A preferred mixture is stearyl alcohol and $TAE_{80}$.

The amount of organic coating material employed in the foam control agents herein should be no less than 1 part organic coating material per part of silicone antifoam. It is preferred to employ the organic coating material and the silicone antifoam in a weight ratio in the range 5:1 to 1:1, more preferably in the range 4:1 to 2:1.

The glycerol is a key ingredient of the foam control agents herein; it is believed to strengten the adsorption of silicone antifoam compound to the carrier particles. Glycerol is present at a weight ratio of 1:4 to 2:1 with the silicone antifoam agent, and at levels of from 2 to 20%, preferably 4% to 10% of the foam control agents herein.

Optional Ingredients

The foam control agents may comprise, in addition to the essential ingredients described hereinabove, optional ingredients, such as waxes, and anti-caking agents.

Preferred waxes are of mineral origin, especially those derived from petroleum, including microcrystalline and oxidised microcrystalline petroleum waxes and paraffin waxes. However synthetic waxes, or natural waxes such as Montan waxes, beeswax, candelilla or carnauba waxes may also be used as may a mixture of any of these waxes. Whatever wax is used it is preferred that its melting point is between 35° and 70° C. so that it is readily liquifiable.

Suitable anti-caking agents include alkoxylated nonionic surfactants such as described hereinafter.

Making Process for the Anti-foam Agent of the Invention

The process is as follows:

The silicone antifoam compound and the glycerol, at a weight ratio such as presently claimed, are mixed together and the mixture is added to the carrier material, which is preferably starch; the mixing then takes place in an Eirich mixer. During the mixing, the temperature raises due to the agitation. When the temperature reaches a value in the range of from 30° to 35° C., the organic coating material, is added in the molten state (e.g. at 85° C., if stearyl alcohol), and the mixing is continued used until approximately 5 minutes after the melting temperature of the organic coating agent is reached (56° to 58° C. for stearyl alcohol).

Granulation has then taken place, and the granules are cooled to room temperature in a fluid bed.

Detergent Compositions

In another embodiment of the present invention, it is herewith provided a detergent composition in powder form, comprising a surface-active agent and a foam control agent such as described above. The amount of foam control agents is from 0.25 to 10%, preferably from 0.5 to 3 by weight of the total detergent composition.

Suitable surface-active agents are of the anionic, cationic, non-ionic or amphoteric type, or mixtures thereof. Suitable anionic organic detergent surfactants include alkali metal soaps of higher fatty acids, alkyl aryl sulphonates, for example sodium dodecyl benzene sulphonate, long chain (fatty) alcohol sulphates, olefine sulphates and sulphonates, sulphated monoglycerides, sulphated ethers, sulphosuccinates, alkane sulphonates, phosphate esters, alkyl isothionates, sucrose esters and fluorosurfactants. Suitable cationic organic detergent surfactants include-alkyl-amine salts, quaternary ammonium salts, sulphonium salts and phosphonium salts. Suitable non-ionic organic surfactants include condensates of ethylene oxide with a long chain (fatty) alcohol or fatty acid, for example $C_{14-15}$ alcohol, condensed with 7 moles of ethylene oxide (Dobanol® 45-7), condensates of ethylene oxide with an amine or an amide, condensation products of ethylene and propylene oxides, fatty acid alkylol amides and fatty amine oxides. Suitable amphoteric organic detergent surfactants include imidazoline compounds, alkylaminoacid salts and betaines.

The detergent compositions herein preferably also contain a builder, which is preferably a non-phosphate species; accordingly, the builder herein preferably is selected from aluminosilicate ion exchangers (zeolites), and water-soluble monomeric or oligomeric carboxylate chelating agents such as citrates, succinates, oxydisuccinates, as well as mixtures of the above species.

Other suitable builder materials include alkali metal carbonates, bicarbonates and silicates, organic phosphonates, amino polyalkylene phosphonates and amino polycarboxylates, ethylene diamine tetraacetic acid and nitrilotriacetic acid. Other suitable water-soluble organic salts are the homo- or co-polymeric polycarboxylic acids or their salts in which the polycarboxylic acid comprises at least two carboxyl radicals separated from each other by not more than two carbon atoms. Polymers of this type are disclosed in GB-A-1,596,756. Examples of such salts are polyacrylates of MW 2000–5000 and their copolymers with maleic anhydride, such copolymers having a molecular weight of from 20,000 to 70,000, especially about 40,000.

Other ingredients which typically form part of a detergent composition in powder form include bleaching agents, such as sodium perborate and percarbonate, bleach activators, anti redeposition agents such as carboxymethyl cellulase, enzymes, brighteners, fabric softening clays, perfumes, dyes, pigments.

EXAMPLE

A foam-control agent in granular form is produced, having the following composition:

| ingredients | percent by weight |
|---|---|
| Silicone antifoam compound* | 12% |
| Glycerol | 12% |
| Stearyl Alcohol | 18% |
| Starch | 58% |

*Polydimethyl siloxane/fumed silica X2/3419 from Dow Corning

A quantity of 3.4 kg of the above foam control agent in granular form is produced, starting from 0.4 kg silicone antifoam agent, 0.4 kg glycerol, 2 kg starch, and 0.6 kg stearyl alcohol in molten state. The process is described hereinabove.

The above granulates are crispy and free flowing; they are incorporated in a detergent composition in powder form, by dry-mixing.

Thanks to the quality of the granulates, this incorporation into the detergent composition does not raise any processing difficulty.

EXAMPLE II

Foam control agents according to the invention can be prepared, wherein tallow fatty acid is used instead of stearyl alcohol; such a foam control agent has been prepared, according to the following composition:

| Ingredients | percent by weight |
|---|---|
| Silicone antifoam compound* | 12% |
| Glycerol | 6% |
| Tallow fatty acid | 15% |
| Starch | 67% |

Typical detergent compositions in powder form in which the present antifoam agents in granular form are included have the following formulae:

| | (all levels in % by weight) | |
|---|---|---|
| Ingredients | Ex. III | Ex. IV |
| LAS | 8.00 | 6.50 |
| TAS | 2.50 | 3.35 |
| FA45E7 | 5.00 | 2.00 |
| Na citrate/citric acid | — | 12.00 |
| Zeolite 4A | 24.00 | 16.00 |
| Copolymer AA/MA | 5.00 | 3.50 |
| Phosphonate | 0.60 | — |
| EDTA | 0.25 | 0.30 |
| Na carbonate | 17.00 | 10.00 |
| Silicate (R = 2) | 2.00 | 2.50 |
| CMC | 0.50 | — |
| Clay | — | 8.50 |
| PB1 | 13.00 | — |
| PB4 | — | 12.00 |
| TAED | 5.70 | 3.20 |
| Enzyme | 1.70 | 1.70 |
| Foam control agent | 0.70 | 0.80 |
| Minors + water | balance to 100% | |

The abbreviations for the individual ingredients have the following meaning:
LAS: sodium salt of linear dodecyl benzene sulfonate
TAS: sodium salt of tallow alcohol sulfate
FA45E7: fatty alcohol ($C_{14}$–$C_{15}$) ethoxylated with about 7 moles of ethylene oxide
Clay: smectite clay
Zeolite 4A: sodium salt of zeolite 4A with average particle size between 1–10 micrometer
Copolymer AA/MA: copolymer of acrylic acid and maleic acid
CMC: carboxymethylcellulose
Phosphonate: sodium salt of ethylenediamine tetramethylene phosphonic acid
EDTA: sodium salt of ethylenediamine tetra acetate
PB1: $NaBO_2.H_2O_2$ (Sodium Perborate Monohydrate)
PB4: $NaBO_2.H_2O_2.3H_2O$ (Sodium Perborate Tetrahydrate).
TAED: tetra acetyl ethylene diamine

I claim:
1. A stable, free-flowing foam-control agent in granular form for the inclusion in a detergent composition in powder form, said foam-control agent comprising:
   a. from 5 to 20% by weight of a silicone antifoam compound,
   b. from 40 to 80% by weight of a carrier material,
   c. from 5% to 30% by weight of an organic coating material selected from:

i. water-soluble or water-dispersible, detergent impermeable, substantially non-surface-active materials;
ii. water-insoluble materials selected from fatty acids, fatty alcohols, fatty acid esters, and mixtures of said water-insoluble materials; and
iii. mixtures of said water-soluble or water-dispersible and water-insoluble materials; and d. from at least about 4% to 20% glycerol in a weight ratio of glycerol to silicone antifoam compound of 1:4 to 2:1.

2. A foam control-agent according to claim 1 wherein the silicone antifoam compound comprises a polydiorganosiloxane and solid silica.

3. A foam-control agent according to claim 1 wherein the carrier material is starch.

4. A foam-control agent according to claim 1 wherein the water-soluble/dispersible, organic coating agent is selected from highly ethoxylated fatty alcohols, condensed with about 25 molar to 80 molar proportions of ethylene oxide.

5. A foam-control agent according to claim 4 wherein the water-insoluble fatty acids or fatty alcohols, or mixtures thereof have a carbon chain length of from 12 to 20 carbon atoms and a melting point in the range of from 45° C. to 80° C.

6. A foam-control agent according to claim 3 wherein the organic coating agent is selected from stearic acid, stearyl alcohol, tallow fatty acid, tallow fatty alcohol, tallow alcohol condensed with about 80 molar proportions of ethylene oxide, and mixtures thereof.

7. A method of making a foam-control agent according to claim 1, wherein the silicone antifoam agent and glycerol are mixed together and added to the carrier material, the organic coating agent is then added, and mixing/granulation follows.

8. A detergent composition in powder form comprising up to 90% by weight of a surface-active agent selected from a group comprising anionic, cationic, non-ionic, or amphoteric agents or mixtures thereof, and a foam-control agent according to claim 1, 2, 3, 5, 6, 7, 11, or 12.

9. A foam-control agent according to claim 2 wherein the carrier material is starch.

10. A foam-control agent according to claim 1 wherein the organic coating agent is selected from stearic acid, stearyl alcohol, tallow fatty acid, tallow fatty alcohol, tallow alcohol condensed with about 80 molar proportions of ethylene oxide, and mixtures thereof.

11. A stable, free-flowing foam-control agent in granular form and suitable for inclusion in a powder-form detergent composition, which foam-control agent comprises:

a. from 8% to 15% by weight of a silicone antifoam agent comprising a mixture of solid silica and a polydimethylsiloxane polymer with trimethylsilyl endblocking units;

b. from 4% to 10% by weight of glycerol admixed with said silicone antifoam agent to form a silicone/glycerol admixture having a weight ratio of glycerol to silicone antifoam agent of from 1:4 to 2:1;

c. from 55% to 65% by weight of a carrier material with which the silicone/glycerol admixture is combined to form particles, said carrier material being selected from starch, kieselguhr and Fuller's earth; and d. from 8% to 22% by weight of an organic coating material for said particles, which coating material is selected from stearic acid, stearyl alcohol, tallow fatty acid, tallow fatty alcohol, tallow alcohol condensed with about 80 molar proportions of ethylene oxide, and mixtures thereof, and which said organic coating material is used in a weight ratio of coating material to silicone antifoam agent ranging from 5:1 to 1:1.

* * * * *